United States Patent [19]

Watanabe

[11] Patent Number: 4,771,345
[45] Date of Patent: Sep. 13, 1988

[54] REPRODUCING APPARATUS

[75] Inventor: Osamu Watanabe, Yaita, Japan

[73] Assignee: Sharp Kabushiki Kaisha, Osaka, Japan

[21] Appl. No.: 815,039

[22] Filed: Dec. 31, 1985

[30] Foreign Application Priority Data

Sep. 12, 1985 [JP] Japan ............................ 60-202710
Sep. 12, 1985 [JP] Japan ............................ 60-202711

[51] Int. Cl.⁴ .................... H04N 5/783; G11B 20/22
[52] U.S. Cl. .......................................... 360/8; 360/31;
360/10.3; 360/10.2; 360/73; 360/64; 360/21;
381/30; 381/35
[58] Field of Search ................ 360/8, 10.1, 10.3, 10.2,
360/73, 64, 36.1, 9.1, 19.1, 21, 31; 358/341, 343;
369/53; 381/30, 35

[56] References Cited

U.S. PATENT DOCUMENTS

| | | | |
|---|---|---|---|
| 3,480,737 | 11/1969 | Greenberg et al. | 360/30 |
| 3,594,513 | 7/1971 | Greenberg et al. | 360/13 |
| 3,786,195 | 1/1974 | Schiffman | 381/34 |
| 3,828,361 | 8/1974 | Schiffman | 360/25 |
| 3,838,218 | 9/1974 | Pfund | 381/33 |
| 3,838,447 | 9/1974 | Loray | 360/25 |
| 3,949,174 | 4/1976 | Sutton | 381/54 |
| 4,040,098 | 8/1977 | Beeson | 360/10.1 |
| 4,342,053 | 7/1982 | Hirota | 360/64 |
| 4,392,161 | 7/1983 | Ota | 360/8 |
| 4,426,666 | 1/1984 | Kobayoshi | 360/10.3 |
| 4,521,815 | 6/1985 | Tokuyana | 360/10.3 |

Primary Examiner—Alan Faber
Attorney, Agent, or Firm—Birch, Stewart, Kolasch & Birch

[57] ABSTRACT

A reproducing apparatus which reproduces speech sounds at a speed faster than a normal reproduction speed. The outputting operation may be performed, making it easier to hear speech sounds when the video searching operation is performed through hearing of the speech sounds in the VTR or the like. The reproduction is adapted to be performed by the other head which is different in azimuth angle during the normal reproduction operation from the double azimuth heads during a given frame reproduction in the 1.5 times speed reproduction with one head of the rotary heads of the normal two heads being provided as a double azimuth head. The noise caused through the reproduction of the adjacent track may be removed.

12 Claims, 6 Drawing Sheets

REPRODUCING APPARATUS

BACKGROUND OF THE INVENTION

The present invention relates to a reproducing apparatus for a video tape recorder or the like and more particularly, to a reproducing apparatus for reproducing speech sounds at a speed faster than a normal reproduction speed.

In a reproducing apparatus such as a video tape recorder or the like, there is a so-called video search function which makes the running speed of a magnetic tape faster than the normal reproducing speed in the reproduction of the recorded image signals. The recorded images are therefore seen in a shorter time.

The sound signal reproduced simultaneously with the image signal, when the tape speed was n times as fast as the normal speed, became a frequency n times the normal sound signal. As the speed of the sound has been increased n times, the sound becomes extremely hard to hear.

To solve this problem, there is a so-called VSC (variable speech control) method of storing in the memory by a clock the sound signals reproduced at a speed faster than the normal reproducing speed to read them from the memory by a clock slower than a storing clock and converting the frequency of the sound signals into the normal frequency. However, during the normal video search, the tape speed is one about ten times as fast, and the speech beomes ten times more rapid than normal if the variable speed control has been performed, thus resulting in an extremely hard-to-hear condition.

SUMMARY OF THE INVENTION

Accordingly, an essential object of the present invention is to control the tape speed so that the variable speech control is performed during the video search operation. The reproducing sound will then become rapid enough so as to be easily hear.

Two times as fast as the normal sound speed (by actual measurement) is a limit for easy hearing in the tape speed, the tape speed is desired to be controlled to be not more than two times the normal speed. In other words, while the tape speed is required to be fast due to the searching operation the tape speed cannot be too fast if it is to easily be heard. Accordingly, approximately 1.5 times as fast as normal is an optimum tape speed.

The reproducing apparatus is composed of image reproducing means, sound reproducing means, reproducing speed switching means, reproducing time compression (VSC) means for sound signals, switching means which switches the sound signals not effected by the VSC means and the sound signals effected by the VSC means to output them. When the reproducing speed has been switched to two times or lower than normal reproducing sped (for example, 1.5 times as fast) by the reproducing speed switch means, the sound signals effected by the VSC means are switched and outputted by the switching means so that the sounds may be easily heard during the video search operation.

A magnetic record reproducing apparatus is provided with a tape delivery means for causing the magnetic tape to run, a speed detecting means for detecting the tape running speed, a phase detecting means which detects control signals recorded on the magnetic tape for the phase control of the magnetic tape and the image reproducing means, a controlling means which transmits given signals to the tape delivering means in accordance with the detecting signals from the speed detecting means and the phase detecting means, the controlling means is provided with compensating means which compensates the detecting signal from the speed detecting means and the detecting signal from the phase detecting means to given values.

A rotary head with a head disposed on the diagonal line of the rotary drum being a double azimuth head, switching means for selecting the reproducing output produced by each of the heads, switch control means which drives the switch means in accordance with the given order are provided. When the recorded magnetic tape is operated at a speed 1.5 times as fast as the normal reproducing speed, the switching operation is effected into one of the double azimuth heads in a vertical blanking period by the switching means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiments thereof with reference to the accompanying drawings, which are given by way of illustration only, and thus are not limitative of the present invention, and in which.

DETAILED DESCRIPTION OF THE INVENTION

Figure 1:
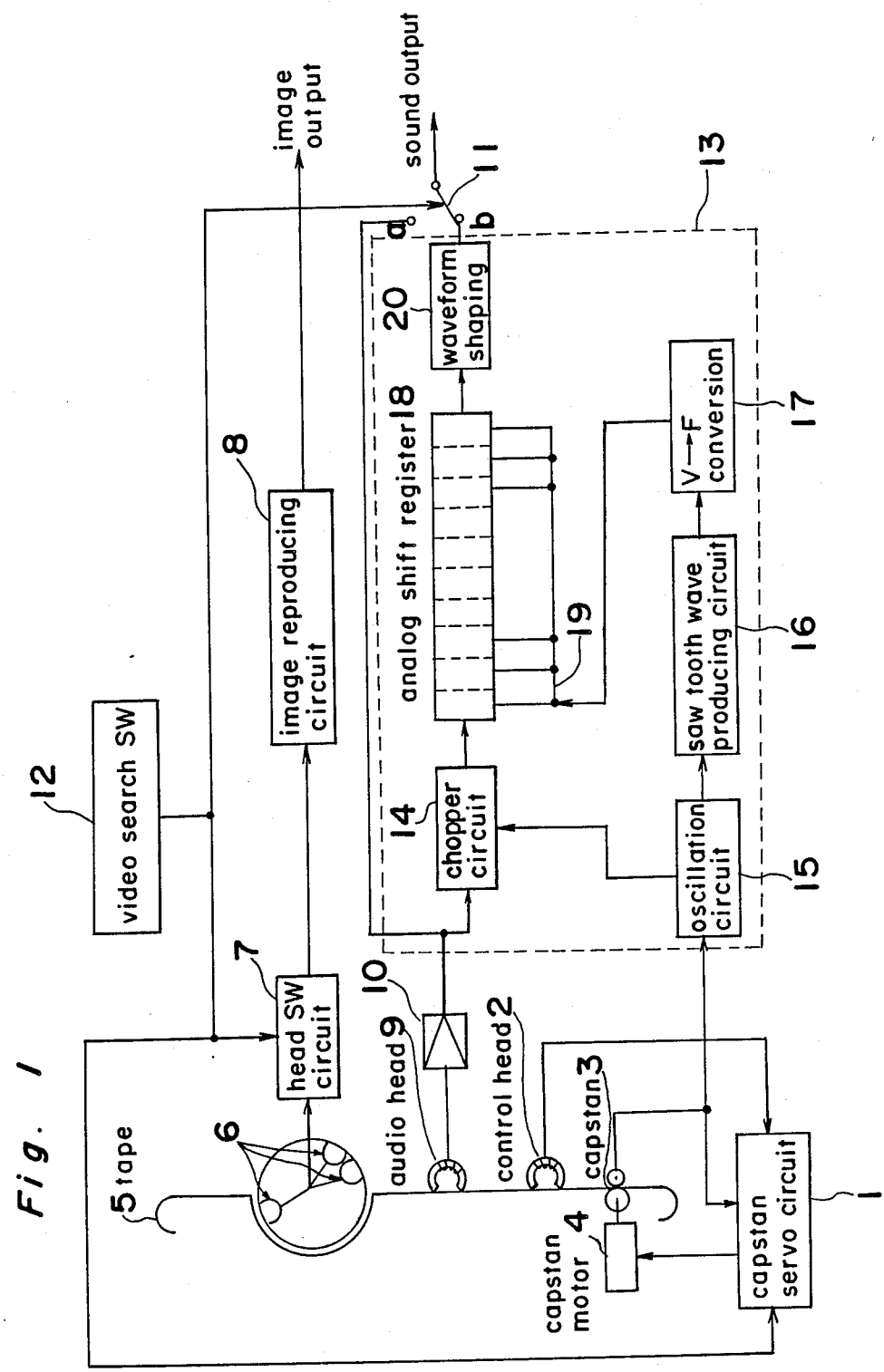
FIG. 1 is a circuit diagram showing the schematic construction in one embodiment of the present invention.

Before the description of the present invention proceeds, it is to be noted that like parts are designated by like reference numerals throughout the accompanying drawings.

FIG. 1 shows an embodiment of the present invention. A capstan servo-circuit 1 controls a capstan motor 4, by a control signal from a control head 2 and a speed signal from a capstan 3, to make the tape 5 have a constant speed.

A rotary head 6 reproduces the image track of the tape 5. Switching and outputting operations and performed in a given order by a head SW circuit 7. It is converted into image signals by an image reproducing circuit 8 and is outputted in image. An audio head 9 reproduces the audio track of the tape 5, which is amplified by an audio AMP 10. As a sound switch SW11 is connected onto the side a during the normal reproducing operation, the output of the AMP 10 is provided as it is in sound through the sound switch SW11.

To provide a video search mode, signals 1.5 times as normal are outputted by the switching operation of the video search SW12.

The capstan servo-circuit 1 changes the operation by a signal which is 1.5 times the normal speed so that the speed of the tape 5 may become 1.5 times as fast as the speed at the normal reproduction. The detailed description of the circuit 1 will be given later.

Also, the head SW circuit 7 changes the operation by 1.5 times the normal speed signal, which will be destructed later in detail.

Also, the sound switch SW is switched onto the side b by a signal which is 1.5 times as fast as normal. Thus, the output of the audio AMP 10 is adapted to be sound-outputted in the sound signals effected by the reproduction time compression means 13.

Figure 2:
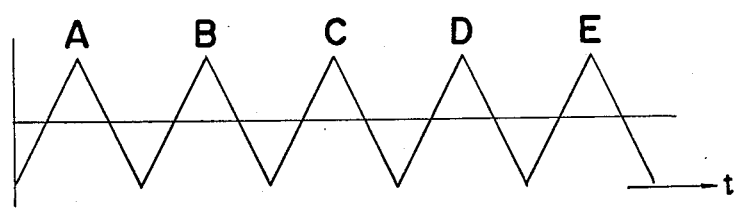
FIGS. 2 through 8 are respective signals waveform charts for explaining the function of each portion of the circuit construction of FIG. 1.
Figure 3:
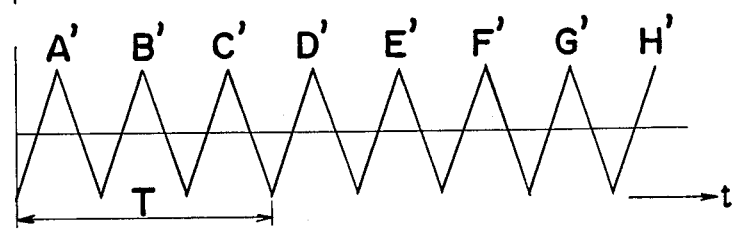
Figure 4:
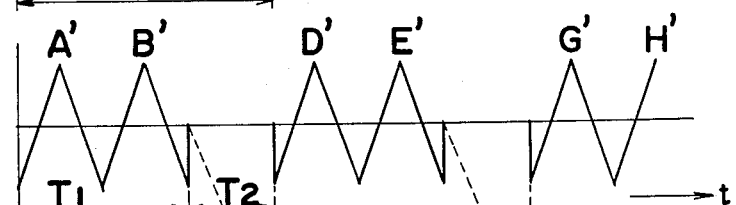
Figure 5:
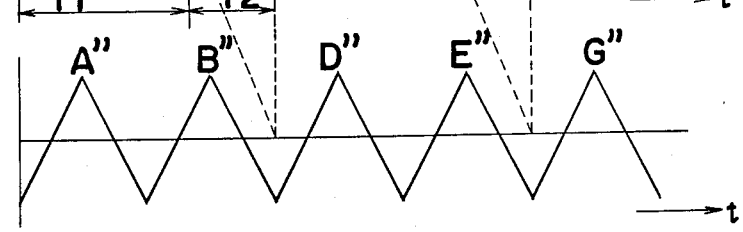
Figure 6:
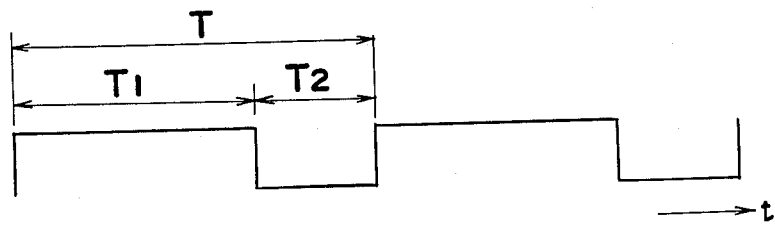
Figure 7:
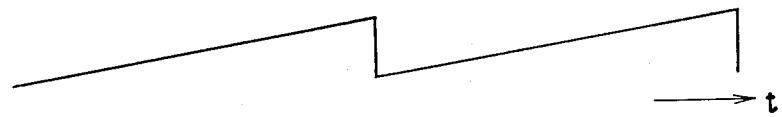
Figure 8:

The reproduction time compression means 13 will be described hereinafter. Assume that the standard reproduction waveform of the audio AMP 10 during the normal reproduction is shown in FIG. 2. The waveform shown in FIG. 3 is 1.5 times as fast as that of FIG. 2. A chopper circuit 14 has the waveform of FIG. 2 as input and chops by T1/T2 the ratio of conduction versus non-conduction through the rectangular-wave output (FIG. 6) of a constant period T (this period is, for example, approximately 20 ms) of an oscillation circuit 15. The oscillation circuit 15 is a circuit which generates a waveform of T1:(T1+T2)=V1:V2 by a speed signal from the capstan 3, wherein V1 is the normal speed, V2 is the speed of the search operation. The chopper circuit 14 causes the input waveform of FIG. 3, by the output of such oscillation circuit 15, as the output waveform of FIG. 4 through the gate operation by the ratio of the T1/T2. Namely, the waveform of FIG. 4 is cut out in waveform only during the period of T2 from the waveform of FIG. 3. A saw-tooth waveform producing circuit 16 includes a waveform shaping circuit and an integrating circuit so that one period may produce the saw-tooth waveform output (FIG. 7) superior in the linearity of the T through the operation by the output of the oscillation circuit 15. A voltage frequency converting circuit 17 has linear voltage frequency characteristics for causing a clock pulse (FIG. 8) which is converted in frequency so as to gradually reduce the oscillation frequency by a voltage (which is directly proportional when the waveform has an inclined angle reverse to that of FIG. 7) inversely proportional to the voltage of the saw-tooth waveform output by a period T conformed to the saw-tooth waveform output through the operation with the output of the saw-tooth waveform producing circuit 16. An analog shift register 18 is adapted to gradually transmit the voltage equal to an input voltage, introduces the output waveform (FIG. 4) of the chopper circuit 14 as the input voltage to gradually transmit the input voltage towards the output terminal every time the clock pulse (FIG. 8) of the voltage frequency converting circuit 17. The analog shift register 18 is called a bucket relay. This register 18 may be composed of a MOS shape IC, and gradually transmits to the condenser capacity of a rear stage the input voltage stored in the condenser capacity of a front stage by the controlling of FET with the clock pulse through the intermittent connection in the combination of the FET with the condenser capacity. The transmission time is determined by the frequency, i.e., width, of the clock pulse. In the drawing, the closer the transmission comes to the end of one period, the longer it becomes. Accordingly, the waveforms A', B' within the T1 period of the output waveform of FIG. 4 within one period T of the output of the voltage frequency converting circuit 17 are extending to A", B" in accordance with the frequency of the clock pulse. The waveform which has been extended to a fundamental frequency conformed to a standard speed record waveform, i.e., a standard speed reproducing waveform (FIG. 2) is provided in the output of the shift register 18 as shown in FIG. 5. As the extended waveform becomes 1/1.5 in the number of the waves per unit time with respect to the fundamental tone of FIG. 2, talking becomes rapid. A waveform shaping circuit 20 removes noises ridden on the output waveform of the shift register 18 to shape noiseless waveform. The output of the waveform shaping circuit 20 is connected as the input of a main amplifier of a tape recorder so that the reproduced sounds from the speaker may be heard.

According to the present invention, as it is constructed as described hereinabove, the high-speed reproduction waveform to appear in the input of the chopper circuit is cut away in a given time by the pulse of the oscillation circuit and is a clock pulse to be caused within a period rendered synchronous to the oscillation frequency. The cut-away waveform remaining within the time is extended so that the waveform of the frequency conformed into the standard speed reproducing waveform may be restored. Thus, the restored waveform is reduced in the number of the waves per unit of time and the record contents, i.e., the sounds, can be easily heard by human ears merely as rapid talking. In this case, as the frequency is the same in the standard reproduction speed, the articulation is not reduced, and the record contents may be sufficiently grasped in a time sufficiently shorter than the record time.

Figure 9:
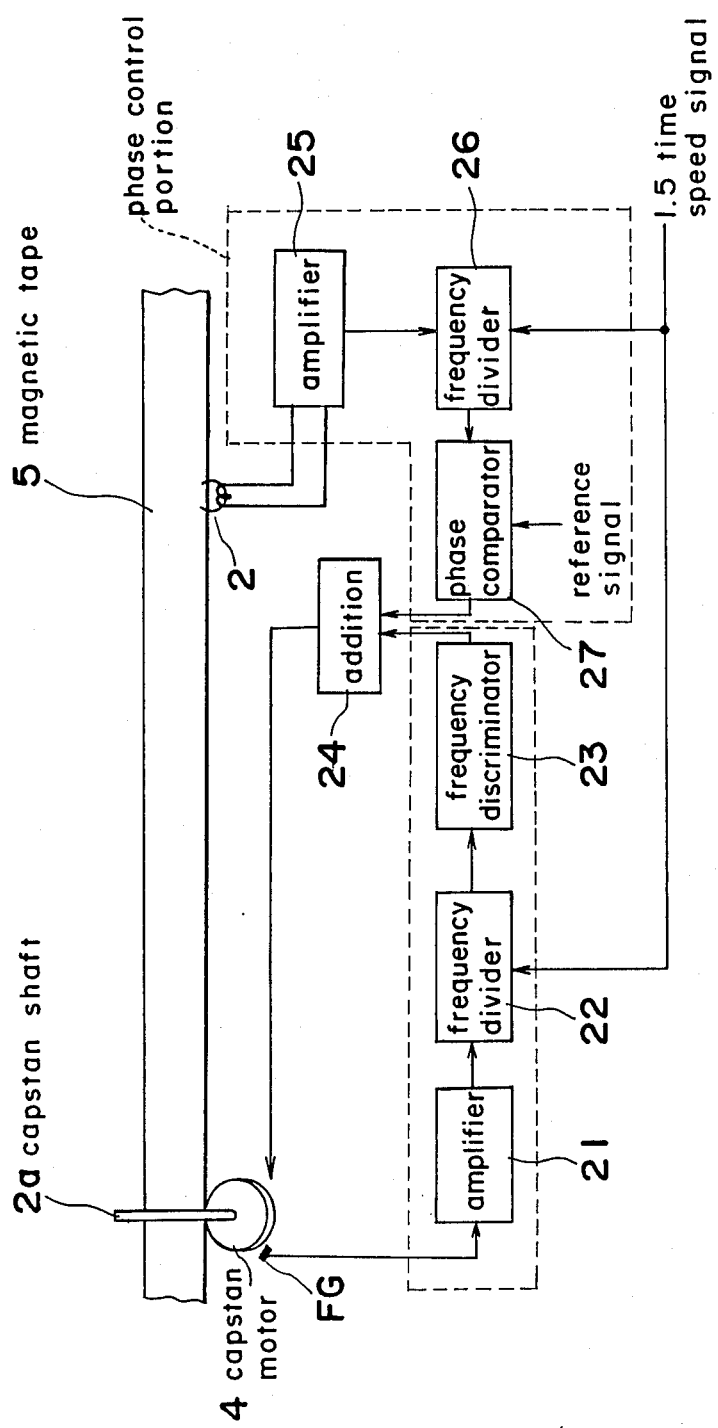
FIG. 9 is a circuit diagram showing the details of a capstan servo-circuit in the circuit construction of FIG. 1.

The tape speed switching means will be described hereinafter. FIG. 9 shows the capstan servo-circuit 1 of FIG. 1 and its vicinity more concretely.

Signals amplified by an amplifier 21 in a speed control portion are inputted to a frequency divider 22. In the normal reproduction, the frequency divider 22 outputs signals as they are from the amplifier 21, but the frequency of the input signal is made twice, when a signal of 1.5 times speed has been inputted, to divide the frequency into three and then performs its outputting operation. The output signal of the frequency divider 22 is inputted to one of the input terminals of an addition amplifier 24 through a frequency discriminator 23. In the frequency discriminator 23, the frequency of the input signal is discriminated to output an input signal as it is unless the signal is divided in frequency by the frequency divider 21 and to output a given signal to make the capstan motor 4 operate 1.5 times faster than normal speed if the signal is divided in frequency.

In the phase control portion, the output signal of an amplifier 25 is inputted into a frequency divider 26. The frequency divider 26 outputs signals, as they are, from the amplifier 25 in the normal reproduction, but divides into three in frequency a control signal, track information, provided from a control head 2 so as to retain the positional relation between the reproducing head and the record track pattern on the magnetic tape 5 when a signal of 1.5 times speed has been inputted into the frequency divider 26. The output signal of the frequency divider 26 is inputted to the other one of the input terminals of an addition amplifier through a phase comparator 27.

In the above-described control block diagram, the frequency dividers 22, 26 and the frequency discriminator 23 output input signals as they are as described already in the normal reproduction so that the speed of the tape 5 is controlled to become a normal speed.

An operation in the reproduction of 1.5 times speed will be described hereinafter.

When 1.5 speed signals are inputted into a frequency divider 22 and a frequency divider 26, the frequency corresponding to the rotation speed from a frequency generator FG is converted into ⅔ by a frequency divider 22 and the successively signal frequency is inputted to an addition amplifier 24 so that a driving signal is delivered from the addition amplifier 24 to multiply by 3/2 (1/5) times the revolution speed of the capstan motor 4. The magnetic tape 5 is adapted to be delivered and received like this, by a speed control portion, at a speed 1.5 times the normal reproducing speed.

Also, as a control signal three-divided in frequency in the phase control portion is inputted into the phase comparator 27, the phase relation between the reproduction head and the record track pattern on the magnetic tape 5 is retained in the 1.5 times speed. Accordingly, the phase relation between the record track pattern on the magnetic tape 5 and the track pattern of the reproduction head is retained even if the reproducing speed of the magnetic tape 5 becomes 1.5 times as fast, thus allowing the noiseless reproduction of 1.5 times speed to be made.

As described hereinabove, the running operation of the magnetic tape is adapted to be controlled in speed during the reproduction of the 1.5 speed, and the positional relation between the record track pattern on the magnetic tape and the track of the reproduction head, i.e., even the phase control is adapted to be performed, thus allowing the noiseless reproduction to be performed even in the reproduction of 1.5 times speed.

A head SW circuit will be described hereafter. In the present invention, double azimuth heads are adopted as a plurality of reproduction heads. One embodiment will be hereinafter described with reference to the drawings.

Figure 10:
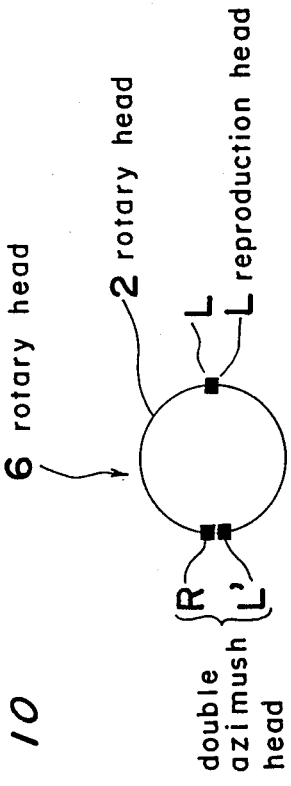
FIG. 10 is a plan view of a rotary head in FIG. 1.
Figure 11:
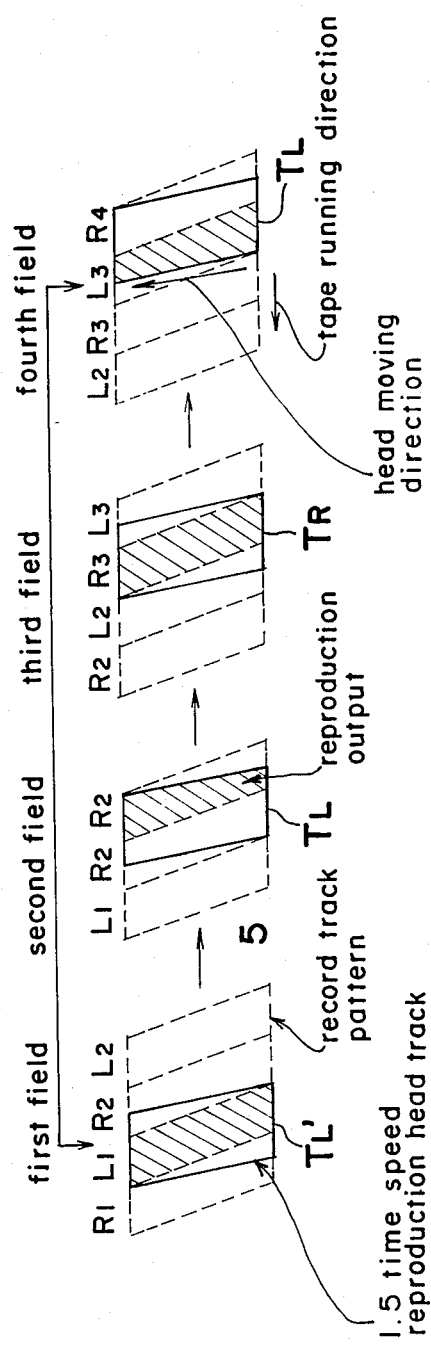
FIG. 11 is a view showing the head track on the magnetic tape by the rotary head.

FIG. 10 shows a rotary head 6 which is used in one embodiment of the present invention and the other reproduction head L' is disposed through a given gap G in the vicinity of one reproduction head R. The production head L' is different in azimuth from the reproduction R and is the same in azimuth as the reproduction head L on a diagonal line. Assume that a horizontal synchronous signal is H and the size of the gap G between the reproduction heads R and L' is 1H or 2H. This construction is called double azimuth head. The positional relation between the magnetic head and the reproduction head when the magnetic tape recorded by the reproduction head 6 has been reproduced in the normal 1.5 times speed is shown in FIG. 11. The reproduction head tracks TL', TL, TR are on the magnetic tape 5 respectively by the reproduction heads L', L, R. The reproducing operation is effected by the use of the reproduction head L' instead of the reproduction head R in the reproduction of a first frame. In the reproduction of the first field, the record track L1 same in azimuth is reproduced by the reproduction head TL'. As the azimuth in the recording operation between the adjacent record tracks R1 and R2 is different from the azimuth angle of the reproduction head L1', the reproduction is not performed.

As described already, in a video tape recorder wherein the running operation of the rotary head 6 and the magnetic tape 5, the record track pattern and the reproduction head track in the reproduction of 1.5 times speed are in relation with four fields as one period as shown in FIG. 11. The reproduction may be switched like TL'-TL-TR-TL . . . for each of the fields in a pattern with four fields as one period. Also, the positional relation between the reproduction head and the record track pattern, i.e., the tracking information is provided by a control signal recorded on the magnetic tape 5 in the normal reproduction speed. The tracking control is required to be performed by a three-divided control signal in the reproduction of 1.5 times speed.

Figure 12:
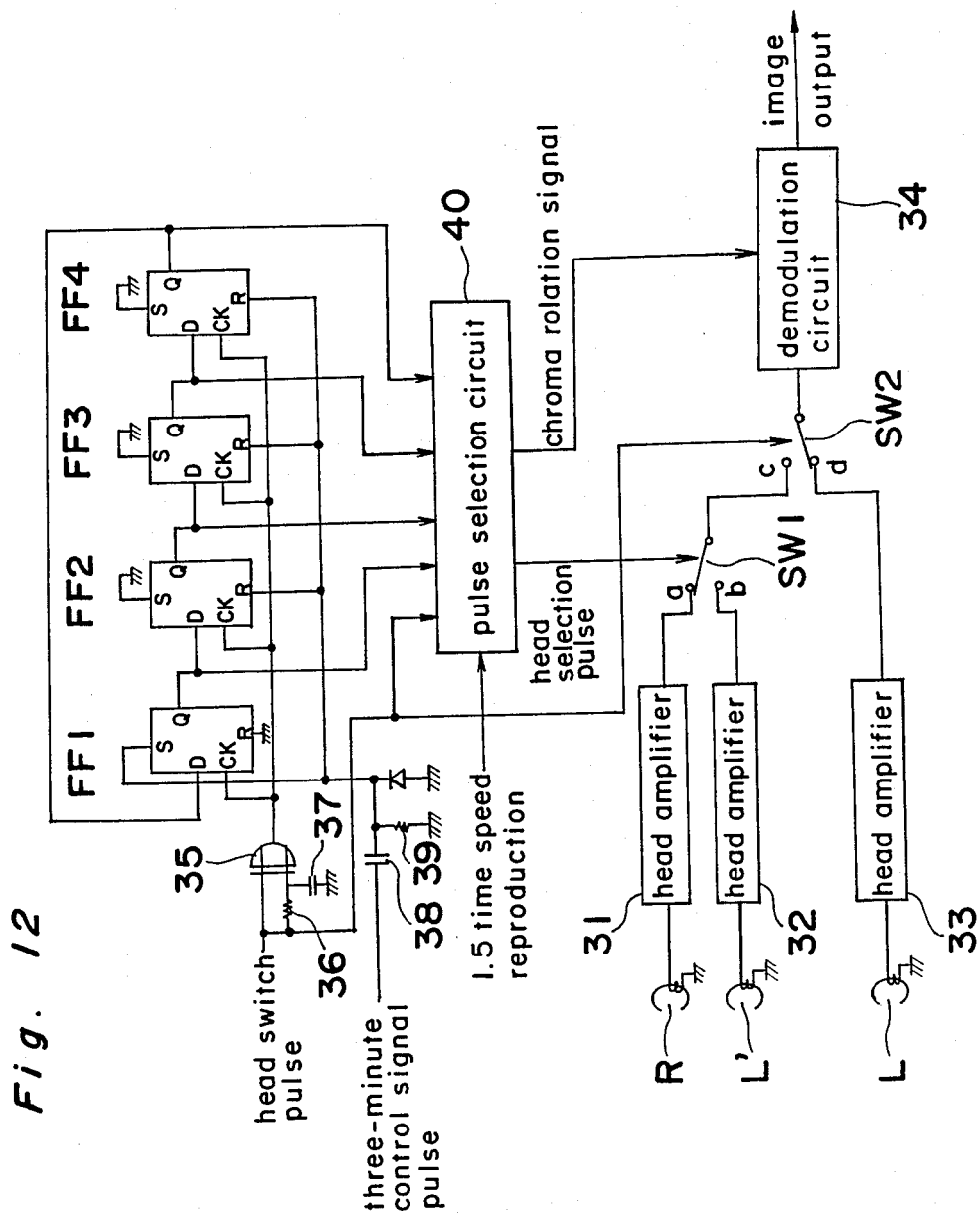
FIG. 12 is a control block diagram for controlling image signals from the rotary head in FIG. 10.

FIG. 12 shows a control block diagram for removing the above-described control.

The reproduction heads R, L', L already described and the head amplifiers 31, 32, 33 are shown in the drawing. A control switch SW1 selects an output signal of the head amplifier 31 or 32, a control switch SW2 selects an output signal coming from the switch SW1 or an output signal of a head amplifier 33. A signal selected from the switches SW1, SW2, is outputted as a given image signal through a demodulation circuit 34.

On the other hand, in the video tape recorder, head switch pulses for switching the reproducing head are composed through the rotation of the rotary head 6. Conventionally, the pulse was used to switch the reproduction head R or L in the rotary head 6, but in this embodiment it is used as a control signal for a control switch SW2 for switching the reproduction head L or either of R or L'. Also, this head switch pulse is inputted into one of the input terminals of the exclusive OR circuit 35 of the two input terminals and is inputted through an integrating circuit composed of a resistor 36 and a capacitor 37. A pulse from the exclusive OR circuit 35 is inputted into both the rising and falling edges of the head switch pulse. The pulse is inputted into each clock terminal CK of a D type of flip-flop (F/F) circuit FF1 through FF4 of four-stage construction. In addition, a signal provided through three frequency divisions of a control signal to be obtained during the reproduction is inputted into a set terminal S of the flip-flop circuit FF1 and into each reset terminal R of the flip-flop circuits FF2 through FF4 through a differentiation circuit composed of a capacitor 38 and a resistor 39. Thus, the flip-flop circuit FF1 is set by the rising edge of the control signal to reset the flip-flop circuits FF2 through FF4. A 1.5 times speed reproducing signal, a head switch pulse, a signal of the output terminal Q of each flip-flop circuit FF1 through FF4 are inputted. A hard selection pulse for controlling the control switch SW1 and a chromarotation signal for controlling a demodulation circuit 34 are outputted from the pulse selection outputting circuit 40.

Figure 13:
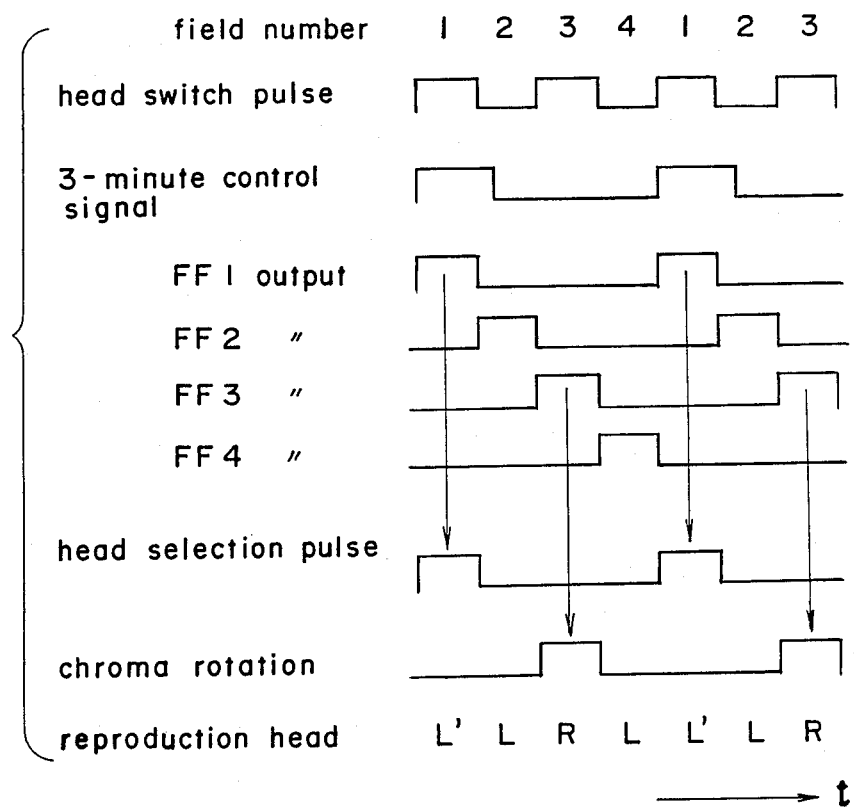
FIG. 13 is a time chart showing the operation of the control block diagram of FIG. 12.

The control operation in the reproduction of 1.5 times speed will be described hereinafter in accordance with the time chart of FIG. 13.

A head selection pulse and a chromarotation signal for use in the eliminating process of the chroma crosstalk by a low-pass conversion color signal demodulation circuit are outputted from the pulse selection circuit 40 in accordance with the signals of the output terminals Q of the flip-flop circuits FF1 through FF4, but these signals are outputted in a predetermined order so that the output signal of the image reproduction may become largest when the 1.5 times speed reproduction signal is kept inputted.

Now, the flip-flop circuit FF1 is set at the pulse rising of a control signal three-divided in frequency in the period of a first field to output "H", and the flip-flop circuits FF2 through FF4 are reset to output the "L". Then, the field becomes a second one. When the head switch pulse falls, the pulse is inputted as a clock signal into the terminal CK of each flip-flop circuit FF1 through FF4 so that the flip-flop circuit FF2 outputs the "H" and the flip-flop circuits FF1, FF3, FF4 output the "L". The flip-flop circuit outputting the "H" sequentially goes to make the round of FF1→FF2→FF3→FF4→FF1 by a clock signal in both edges of the head switch pulse. A pulse which becomes one period in four fields is provided by this description, the head selection pulse becomes "H" only in the first field by the pulse selection circuit 40. The switch SW1 is switched onto the side b and the signal from the reproduction head L' is selected. And the head selection pulse becomes "L" in the other second through fourth fields, the switch SW1 is turned onto the side a so that the signal from the reproduction head R is selected. The switch SW2 is controlled in accordance with the head switch pulse. In the "H", the switch SW2 is switched onto the side c, namely, the signal from the switch SW1 is selected. In the "L", the signal from the side a, namely, the reproduction head L, is selected. Thus, as shown in, for example, FIG. 2, the reproduction head of L' in the first field, the reproduction head L in the second field, the reproduction head R in the third field, the reproduction head L in the fourth field are selected, in the subsequent four fields, resulting in that one period is repeated. The image reproduction signal of 1.5 times speed of the noiseless is provided in this manner. In addition, the chromarotation signal is fed into the demodulation circuit 34 so that the normal color reproduction is also performed. Also, as the switching operation of the reproduction head is performed during the vertical blanking period, no skew noises through the reproduction head switch operation appear on the reproduction picture face.

During the normal reproduction, the head selection pulse is "L" when the switch SW1 is on the side a thereby selecting a reproduction head R. The switch SW2 is on the side c when the head switch pulse is "H". Namely, a signal from the reproduction head is selected. It is on the side d when the head switch pulse is "L". Namely, a signal from the reproduction head L is selected. Also, the head switch pulse inputted into the pulse selecting circuit 40 is used, as it is, as a chromarotation signal.

The above is explained by so-called double azimuth 3 heads of a normal head L and double azimuth heads R, L'. When a guard band is caused in the record track pattern in the 1.5 times speed reproduction, the noiseless reproduction of 1.5 times speed may be performed by double azimuth 4 heads using 2 double azimuth heads.

As described hereinabove, the reproduction is adapted to be performed by the other head which is different in azimuth angle during the normal reproduction operation from the double azimuth heads during a given frame reproduction in the 1.5 times speed reproduction with one head of the rotary heads of the normal two heads being provided as a double azimuth head. Therefore, the noises caused through the reproduction of the adjacent track may be removed.

As is clear from the foregoing description, according to the arrangement of the present invention, the outputting operation may be performed, making it easier to hear speech sounds when the video searching operation is performed through hearing of the speed sounds in the VTR or the like.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method for reproducing images and sounds from a magnetic tape having at least audio and visual information stored thereon, said audio information having an intended reproduction frequency range at a preselected normal reproduction tape speed, said method comprising the steps of:

moving said tape through a reproduction apparatus at a selected tape speed;

reading audio information stored on said tape to develop an audio information signal;

speed scanning said audio information signal at a review tape speed faster than said normal reproduction tape speed to allow monitoring of said audio information stored on said tape while allowing comprehension by a user of said audio information, said step of speed scanning using at least a rotary head, said rotary head having two sets of signal detection heads disposed on opposite sides of said rotary head, one of said sets being double azimuth heads, said step of speed scanning including, increasing the speed of said tape from the normal tape reproduction speed to the review tape speed, said increasing stop increasing the frequencies of said audio information signal in proportion to the increase in the speed of of said tape.

removing periodic and variably selectively portions of said audio information signal, and expanding remaining portions of said audio information signal so that the frequencies of the remaining portions are substantially within said intended reproduction frequency range to develop a speed search information signal;

rotating said rotary head as said tape is moving;

using all said signal detection heads to detect said video portions of said tape when said tape is moving at said selected speed;

using only one signal detection head of said double azimuth heads along with said detection head on said opposite side of said rotary head to detect said video portion of said tape when said tape speed is increased; and converting said speed search information signal, when scanning, into an audible output of said speed search information, said audible output being recognizable as a time shortened version of said audio information stored on said tape.

2. The method as recited in claim 1 wherein said step of increasing the speed of said tape changes said tape speed such that said tape speed becomes 1.5 times faster than said preselected, normal tape speed.

3. The method as recited in claim 1 wherein said step of converting is responsive to said audio information signal such that said audio information signal can be converted to a normal audible output when said tape is moved at said preselected, normal tape speed, said normal audible output being recognizable as said audio information stored on said tape.

4. The method as recited in claim 1 wherein said step of removing includes the following steps:
chopping said audio signal into segments; and
placing said segments in an analog shift register.

5. A reproducing apparatus for reproducing images and sounds from a magnetic tape having at least audio and visual information stored thereon, said audio information having an intended reproduction frequency range at a preselected, normal reproduction tape speed, said apparatus comprising:
drive means for moving said tape through said apparatus at a selected tape speed;
audio head means for reading at least said audio information from said tape in order to develop an audio information signal,
a rotary head having two sets of signal detection heads on opposite sides thereof, one of said sets including double azimuth heads, all of said heads being used to detect the video portions of said tape when said tape is moving at said preselected, normal tape speed;
speed scanning means for increasing the speed at which said drive means moves said tape through said apparatus to a review tape speed, said speed scanning means monitoring said audio information signal stored on said tape while allowing comprehension of said audio information of said apparatus, said speed scanning means further including,
means for increasing the speed of said tape from the normal reproduction speed to a variably selectable review tape speed, said means for increasing increases the frequencies of said audio information signal in proportion to the increase in the speed of said tape,
means for removing periodic portions of said audio information signal, the proportion of said periodic portions to said total audio information signal being related to the ratio of said variably selectable review tape speed to said normal reproduction speed, and
means for expanding remaining portions of said audio information signal so that the frequencies of the remaining portions are substantially within said intended reproduction frequency range to develop a speed search information signal;
means for causing only one of said double azimuth heads to be used for detecting when said tape speed is increased; and
means for converting said speed search information into an audible output of said speed search information, said audible output being recognizable as a time shortened version of said audio information stored on said tape.

6. The reproducing apparatus as recited in claim 5, wherein said means for increasing the speed of said tape increases said speed by 1.5 times said preselected, normal tape speed.

7. The reproducing apparatus as recited in claim 5, wherein said means for converting is responsive to said audio information signal such that said audio information signal can be converted to a normal audible output when said tape is moving at said preselected, normal tape speed, said normal audible output being recognizable as said audio information stored on said tape.

8. The reproducing apparatus as recited in claim 5, wherein said means for removing further includes a chopper circuit for chopping said audio signal into segments and an analog shift register for storing said segments.

9. The reproducing apparatus as recited in claim 5 wherein the means for removing comprises:
analog shift register means for storing substantially all retained portions of said audio information signal;
means for developing a speed signal representing the speed of said tape;
oscillation circuit means, responsive to said speed signal, for developing a repetitive pulse having a period related to the speed of said tape;
chopper circuit means responsive to said repetitive pulse developed by said oscillation circuit means, for selectively interrupting the supply of said audio information signal to said analog shift register means to thereby supply only the retained portions of said audio information signal.

10. The reproducing apparatus as recited in claim 9 wherein said means for removing further comprises:
saw tooth wave circuit means, responsive to said repetitive pulse, for developing a saw tooth wave signal; and
a voltage frequency converting means, operatively connected between said saw tooth wave circuit means and said analog shift register means, for supplying a frequency signal having a frequency varying with voltage of said saw tooth wave signal, said frequency signal being supplied to a clock input of said analog shift register means.

11. A reproducing apparatus for reproducing from magnetic tape comprising:
video reproducing means for reproducing video information recorded in the magnetic tape;
audio reproducing means for reproducing audio information recorded in the magnetic tape;
reproducing speed changing means for changing a reproducing speed of said video information and audio information by 1.5 times a normal reproduction speed;
time compressing means for compressing reproduction time of the audio information; and
switching means for selectively outputting an audio signal to the time compressing means;
said video reproducing means including,
a rotary head with a signal detection head provided on
a diagonal line of a rotary drum, said signal detection head having double azimuth heads, and
switch control means for driving said switching means in accordance with a selected sequence;
said reproducing speed changing means including,
tape feeding means for running the magnetic tape,
speed means for detecting running speed of the magnetic tape,
phase detecting means for detecting a control signal recorded on the magnetic tape,
control means for outputting a predetermined control signal to said tape feeding means in response to both speed detecting signals from the speed detecting means and phase detecting signals from the phase detecting means, and
amending means for dividing both the speed detecting signals and phase detecting signals to be output to the control means when reproducing at a speed 1.5 times a normal reproducing speed.

12. The reproducing apparatus as recited in claim 11, wherein the amending means divides the speed detecting signals by 3/2 and divides the phase detecting signals by 3.

* * * * *